(12) United States Patent
Loutsch et al.

(10) Patent No.: US 8,845,778 B2
(45) Date of Patent: *Sep. 30, 2014

(54) METHOD FOR FEEDING A BURDEN TO A BLAST FURNACE

(75) Inventors: Jeannot Loutsch, Mondercange (LU);
Jean-Paul Simoes, Walferdange (LU);
Lionel Hausemer, Steinsel (LU)

(73) Assignee: Paul Wurth S.A., Luxembourg (LU)

( * ) Notice: Subject to any disclaimer, the term of this patent is extended or adjusted under 35 U.S.C. 154(b) by 267 days.

This patent is subject to a terminal disclaimer.

(21) Appl. No.: 13/266,288

(22) PCT Filed: Apr. 21, 2010

(86) PCT No.: PCT/EP2010/055299
§ 371 (c)(1),
(2), (4) Date: Oct. 26, 2011

(87) PCT Pub. No.: WO2010/124980
PCT Pub. Date: Nov. 4, 2010

(65) Prior Publication Data
US 2012/0043705 A1      Feb. 23, 2012

(30) Foreign Application Priority Data

Apr. 28, 2009   (LU) .......................................... 91558

(51) Int. Cl.
| C21B 7/00 | (2006.01) |
| C10G 1/10 | (2006.01) |
| F27D 17/00 | (2006.01) |
| C21B 7/20 | (2006.01) |
| C21B 5/06 | (2006.01) |
| F27B 1/20 | (2006.01) |
| F27D 3/10 | (2006.01) |

(52) U.S. Cl.
CPC ... *C21B 7/20* (2013.01); *C10G 1/10* (2013.01); *F27D 17/008* (2013.01); *F27D 17/004* (2013.01); *C21B 5/06* (2013.01); *F27B 1/20* (2013.01); *C21B 7/002* (2013.01); *C10G 2300/4081* (2013.01); *F27D 2003/105* (2013.01)
USPC ............................................... 75/469; 75/458

(58) Field of Classification Search
CPC ........ C21B 13/0033; C21B 7/18; C21B 7/20; F27B 1/20
USPC ........................................... 75/469, 458, 468
See application file for complete search history.

(56) References Cited

U.S. PATENT DOCUMENTS

| 3,955,693 | A | 5/1976 | Legille |
| 4,067,452 | A | 1/1978 | Berzins |
| 6,478,841 | B1 | 11/2002 | Faccone |
| 8,512,439 | B2 * | 8/2013 | Loutsch et al. .................. 75/469 |

FOREIGN PATENT DOCUMENTS

| CN | 101058081 A | 10/2007 |
| FR | 2859483 A1 | 3/2005 |
| JP | 58161715 A | 9/1983 |
| JP | 61187361 | 11/1986 |
| JP | 2004309067 | 11/2004 |
| LU | 73752 | 6/1976 |

OTHER PUBLICATIONS

International Search Report PCT/EP2010/055299: Dated Aug. 31, 2011.
Y. Zhang, "Numerical and experimental investigation on the prevention of CO deflagration", Journal of Loss Prevention in the Process Industries, vol. 22, No. 2, Mar. 1, 2009, pp. 169-175, XP026000229.
Chinese Office Action for corresponding CN appliction No. 201080016772.4 filed Apr. 21, 2010; Mail date Mar. 4, 2013.
Jie Lin, "Top Even Pressure Control of Large Blast, Furnace in Taiyuan Iron and Steel Co", Metallurgical Automation, Issue 01, vol. 30, p. 66-67.
Japanese Office Action for corresponding application P2012-507684 Mail date Nov. 13, 2013.

\* cited by examiner

*Primary Examiner* — Scott Kastler

(74) *Attorney, Agent, or Firm* — Cantor Colburn LLP

(57) ABSTRACT

The present invention proposes a method for feeding a burden to a blast furnace (32), wherein the method comprises providing a charging device (38) having at least one material hopper (40), the material hopper (40) comprising a hopper chamber (42), a material inlet aperture for feeding a burden into the hopper chamber (40), and a material discharge aperture for feeding a burden from the hopper chamber (40) to the blast furnace (32); the material inlet aperture having an associated inlet seal valve 44) for opening and closing the material inlet aperture and the material discharge aperture having an associated material discharge valve (46) for opening and closing the material discharge aperture. The method further comprises opening the material inlet aperture and closing the material discharge aperture; feeding a burden into the hopper chamber (40) through the material inlet aperture; closing the inlet seal valve (44); pressurizing the hopper chamber (40) by feeding pressurizing gas into the hopper chamber (40); and opening the material discharge valve (46) and feeding the burden from the hopper chamber (40) to the blast furnace (32). According to an important aspect of the invention, the method further comprises subjecting at least a portion of a top gas recovered from the blast furnace (32) to a recycling process wherein carbon dioxide is removed from the recovered top gas; and feeding at least a portion of the recovered carbon dioxide as pressurizing gas into the hopper chamber (40) for pressurizing the hopper chamber (40).

15 Claims, 4 Drawing Sheets

Fig. 1 — PRIOR ART —

METHOD FOR FEEDING A BURDEN TO A BLAST FURNACE

TECHNICAL FIELD

The present invention generally relates to a method for feeding a burden to a blast furnace, in particular to a blast furnace installation with top gas recycling.

BACKGROUND

A burden, also often referred to as charge material, is fed into a blast furnace through a charging device arranged above the blast furnace. Such a charging device generally comprises one or more material hoppers for temporarily receiving the burden. The material hoppers are also used for weighing the burden contained therein and thereby control the amount of burden fed into the blast furnace.

During filling of the material hopper, the latter must be at atmospheric pressure. However, when the burden is fed into the blast furnace, the material hopper must be at blast furnace pressure. Therefore, the material hopper must be pressurized before the burden is transferred from the material hopper to the blast furnace.

This pressurization is generally carried out by feeding semi-clean top gas to the material hopper as shown in FIG. 1 and described amongst others in LU 73752. The blast furnace 10 comprises piping 12 for recovering top gas from a top section of the blast furnace. The recovered top gas is fed through a primary cleaning stage 14 and a secondary cleaning stage 16 before it is dried in a drying unit 18 and fed to a gas circuit 20. The secondary cleaning stage 16 comprises a primary prewashing and cooling stage 22 and a subsequent purification stage 24 wherein the gas is expanded. Semi-clean gas is extracted after the primary prewashing and cooling stage 22 and fed into a hopper chamber of a material hopper 26 for pressurizing the latter. Before the purification stage 24, the top gas is still at a relatively high pressure but must be compressed up to a pressure slightly above blast furnace pressure.

During the filling of the material hopper, air is drawn into the hopper chamber. When the material hopper is then sealed prior to pressurizing, the air gets trapped in the hopper chamber. The feeding of semi-clean gas into the hopper chamber forms a gas mixture comprising $O_2$ from the atmospheric air and combustible gases CO and $H_2$. In some cases, this gas mixture may occasionally lead to small deflagrations caused by impacting burden in the hopper. Such deflagrations should however be avoided as they may damage the material hopper.

In some cases, in particular in installations with higher CO and $H_2$ concentrations, the risk of such deflagrations gets higher. This is in particular the case for top gas recirculation installations, wherein top gas is treated and a gas rich in CO and $H_2$ is fed back into the blast furnace through the tuyere system. This inevitably leads to a higher concentration of CO and $H_2$ in the material hopper and therefore to a higher risk of deflagrations. The risk of deflagrations is also increased if natural gas is injected in high quantities.

It should also be noted that attempts have been made in recent years to reduce $CO_2$ emissions from blast furnaces so as to contribute to the general worldwide reduction of $CO_2$ emissions. More emphasis has therefore been put on top gas recirculation installations wherein blast furnace top gas is fed to a $CO_2$ removal unit wherein the $CO_2$ content in the top gas is reduced, e.g. by Pressure Swing Adsorption (PSA) or Vacuum Pressure Swing Adsorption (VPSA), as for example shown in U.S. Pat. No. 6,478,841. PSA/VPSA installations produce a first stream of gas which is rich in CO and $H_2$ and a second stream of gas rich in $CO_2$ and $H_2O$. The first stream of gas may be used as reduction gas and injected back into the blast furnace. The second stream of gas is removed from the installation and disposed of. This disposal controversially consists in pumping the $CO_2$ rich gas into pockets underground for storage.

There is a need to provide an improved method for feeding a burden into a blast furnace, while avoiding deflagrations, in particular in view of the fact that top gas recirculation installations are becoming increasingly more popular.

BRIEF SUMMARY

The invention provides an improved method for feeding a burden into a blast furnace.

The present invention proposes a method for feeding a burden to a blast furnace, wherein the method comprises providing a charging device having at least one material hopper, the material hopper comprising a hopper chamber, a material inlet aperture for feeding a burden into the hopper chamber, and a material discharge aperture for feeding a burden from the hopper chamber to the blast furnace; the material inlet aperture having an associated inlet seal valve for opening and closing the material inlet aperture and the material discharge aperture having an associated material discharge valve for opening and closing the material discharge aperture. The method further comprises opening the material inlet aperture and closing the material discharge aperture; feeding a burden into the hopper chamber through the material inlet aperture; closing the inlet seal valve; pressurizing the hopper chamber by feeding pressurizing gas into the hopper chamber; and opening the material discharge valve and feeding the burden from the hopper chamber to the blast furnace. According to an important aspect of the invention, the method further comprises subjecting at least a portion of a top gas recovered from the blast furnace to a recycling process wherein carbon dioxide is removed from the recovered top gas; and feeding at least a portion of the recovered carbon dioxide as pressurizing gas into the hopper chamber for pressurizing the hopper chamber.

The hopper chamber is pressurized with $CO_2$ rather than with the semi-clean gas comprising the combustible gases CO and $H_2$. The use of $CO_2$ as pressurizing gas allows the hopper chamber to be filled with a non-combustible gas that is readily available in top gas recirculation installations. Indeed, $CO_2$ must be removed from the recovered top gas before it is reused. Instead of discarding the removed $CO_2$, it can now be used to pressurize the hopper chamber of the material hopper. As the $CO_2$ is a non-combustible gas, it does not react with any $O_2$ that might still be present in the hopper chamber, whereby deflagrations can be avoided. The non-combustive $CO_2$ gas can, in the context of the present application, also be referred to as inert gas.

It should be noted that, in order to avoid deflagrations another inert gas, such as $N_2$ may be fed into the hopper chamber. However, $N_2$ should not be present in the blast furnace or in the $CO_2$ removal unit.

Preferably, the carbon dioxide is removed from the recovered top gas by Pressure Swing Adsorption or Vacuum Pressure Swing Adsorption.

According to one embodiment of the invention, at least a portion of the recovered carbon dioxide is fed to a chute transmission gearbox of the charging device for maintaining an overpressure—with respect to the blast furnace pressure—in the chute transmission gearbox and for emergency cooling.

The overpressure may be very small and a pressure difference of about 0.1 bar may be sufficient.

According to another embodiment of the invention, at least a portion of the recovered carbon dioxide is fed to a valve casing of the charging device for maintaining an overpressure—with respect to the blast furnace pressure—in the valve casing and for emergency cooling. The overpressure may be very small and a pressure difference of about 0.1 bar may be sufficient.

Before being subjected to the recycling process, the recovered top gas is advantageously subjected to a cleaning process. Such a cleaning process may comprise feeding the recovered top gas through a primary cleaning stage, generally a dry cleaning stage, for producing a partially cleaned top gas; feeding the partially cleaned top gas through a secondary cleaning stage, generally a wet cleaning stage, for producing a cleaned top gas; and feeding the cleaned top gas through a drying stage for drying the cleaned top gas. It should be noted that, instead of the wet cleaning stage, a further dry cleaning stage may be provided.

The secondary cleaning stage may comprise a first step wherein the partially cleaned top gas is pre-washed and cooled; and a second step wherein the partially cleaned top gas is further washed and expanded.

Preferably, the recovered carbon dioxide is fed through a booster unit and buffer tank before being fed to the charging device, in particular if $CO_2$ is not pressurized or not sufficiently pressurized.

The material hopper may comprise a gas inlet with an associated gas inlet valve and a gas outlet with an associated gas outlet valve. The method then preferably comprises closing the inlet seal valve and opening the gas outlet valve before opening the gas inlet valve; allowing a predetermined amount of pressurizing gas to flow through the hopper chamber and to escape via the gas outlet before closing the gas outlet valve and pressurizing the hopper chamber. This allows the hopper chamber to be flushed of air before it is pressurized. Up to three times the volume of the hopper chamber may be flushed through the hopper chamber to ensure that all air has been evacuated. It should be noted that the flushing may be carried out with any inert gas, such as $CO_2$ or $N_2$. $CO_2$ is however preferred in the case of top gas recirculation installations.

The gas recovered from the hopper chamber via the gas outlet may, according to one embodiment of the invention, be recycled and fed into the secondary cleaning stage.

The recovered gas from the hopper chamber via the gas outlet may, according to another embodiment of the invention, be fed to a casthouse dedusting system.

The recovered gas from the hopper chamber via the gas outlet may, according to a further embodiment of the invention, be fed into a portion of the recovered carbon dioxide not used as pressurizing gas, e.g. into a $CO_2$ circuit.

Preferably, the gas recovered from the hopper chamber via the gas outlet is fed through a filter arrangement before being fed into the portion of recovered carbon dioxide not used as pressurizing gas.

Advantageously, the recovered top gas is, after removing the carbon dioxide therefrom, fed back into the furnace as reducing gas.

The charging device of the present invention may be of the Bell Less Top type, is however not limited thereto.

BRIEF DESCRIPTION OF THE DRAWINGS

Preferred embodiments of the invention will now be described, by way of example, with reference to the accompanying drawings, in which.

DETAILED DESCRIPTION

Figure 1:
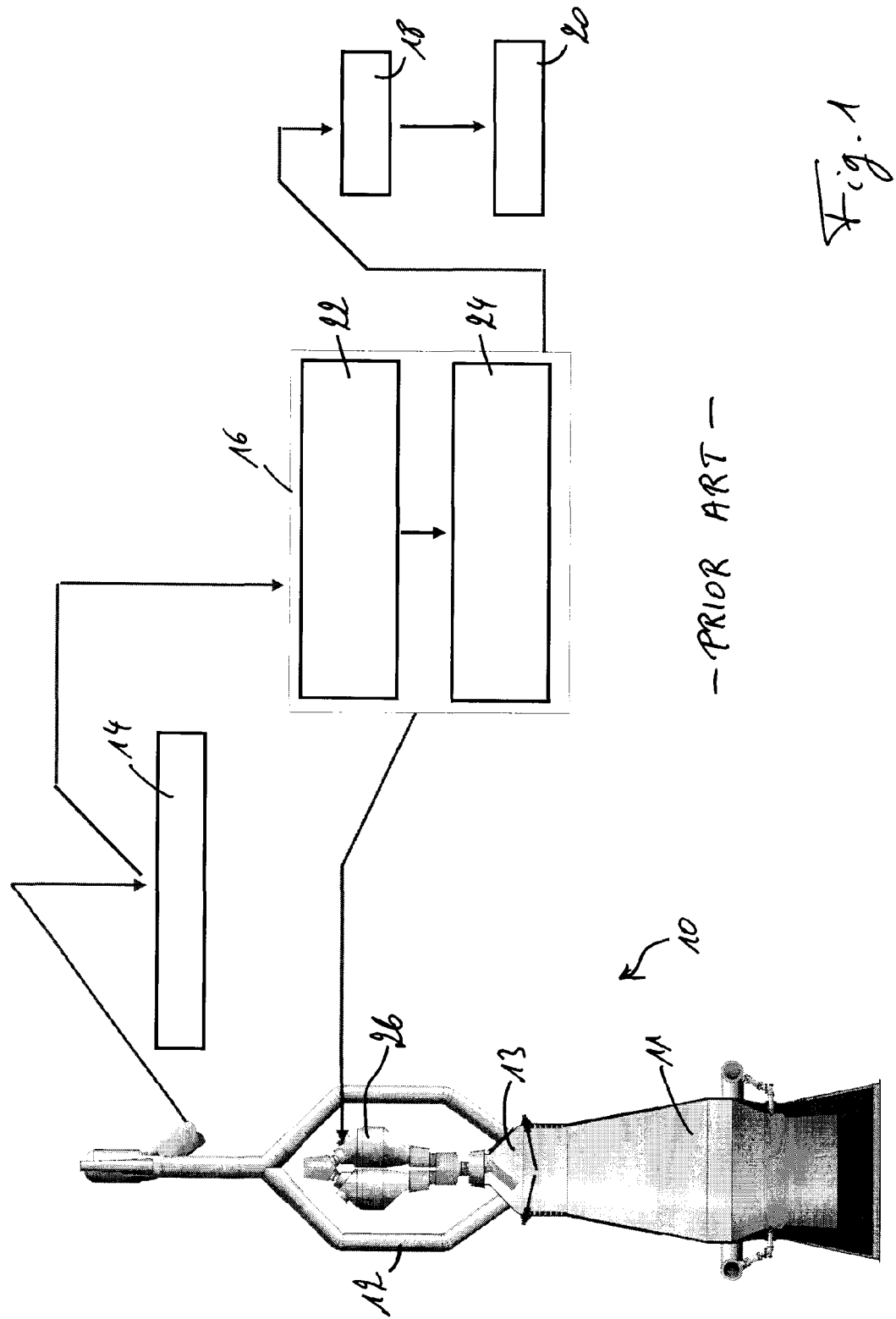
FIG. 1 is a schematic view of a blast furnace installation according to the prior art, comprising a blast furnace and a top gas cleaning installation.

FIG. 1 generally shows a prior art blast furnace installation 10 comprising a blast furnace 11 and piping 12 for recovering top gas from a top section 13 of the blast furnace 11. The recovered top gas is fed through a primary cleaning stage 14 and a secondary cleaning stage 16 before it is dried in a drying unit 18 and fed to a gas circuit 20. The secondary cleaning stage 16 comprises a primary prewashing and cooling stage 22 and a subsequent purification stage 24 wherein the gas is expanded. Semi-clean gas is extracted after the primary prewashing and cooling stage 22 and fed into a hopper chamber of a material hopper 26 for pressurizing the latter. Before the purification stage 24, the top gas is still at a relatively high pressure but must be compressed up to a pressure slightly above blast furnace pressure.

Figure 2:
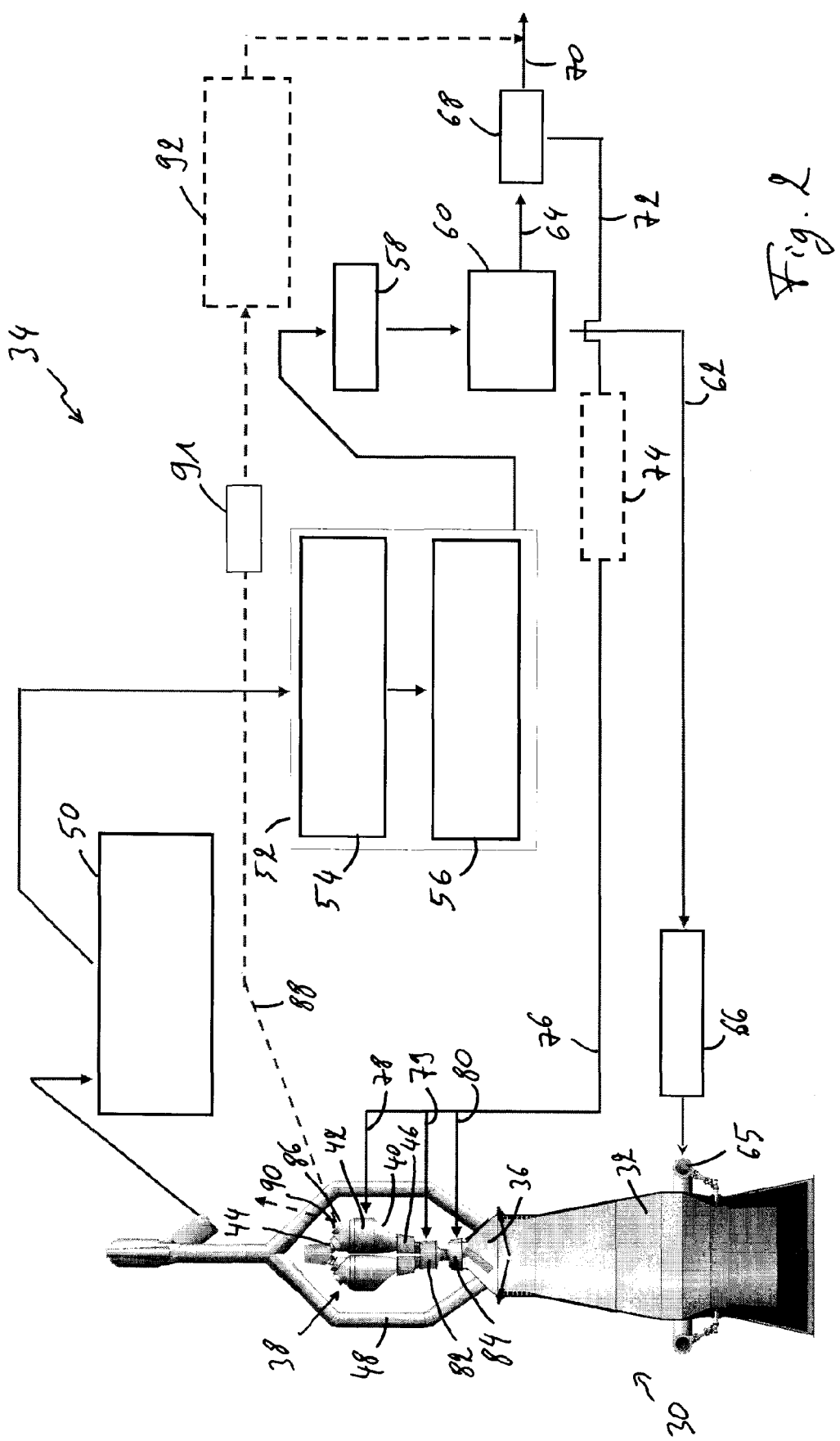
FIG. 2 is a schematic view of a blast furnace installation according to a first embodiment of the present invention, comprising a blast furnace and a top gas recycling installation.
Figure 3:
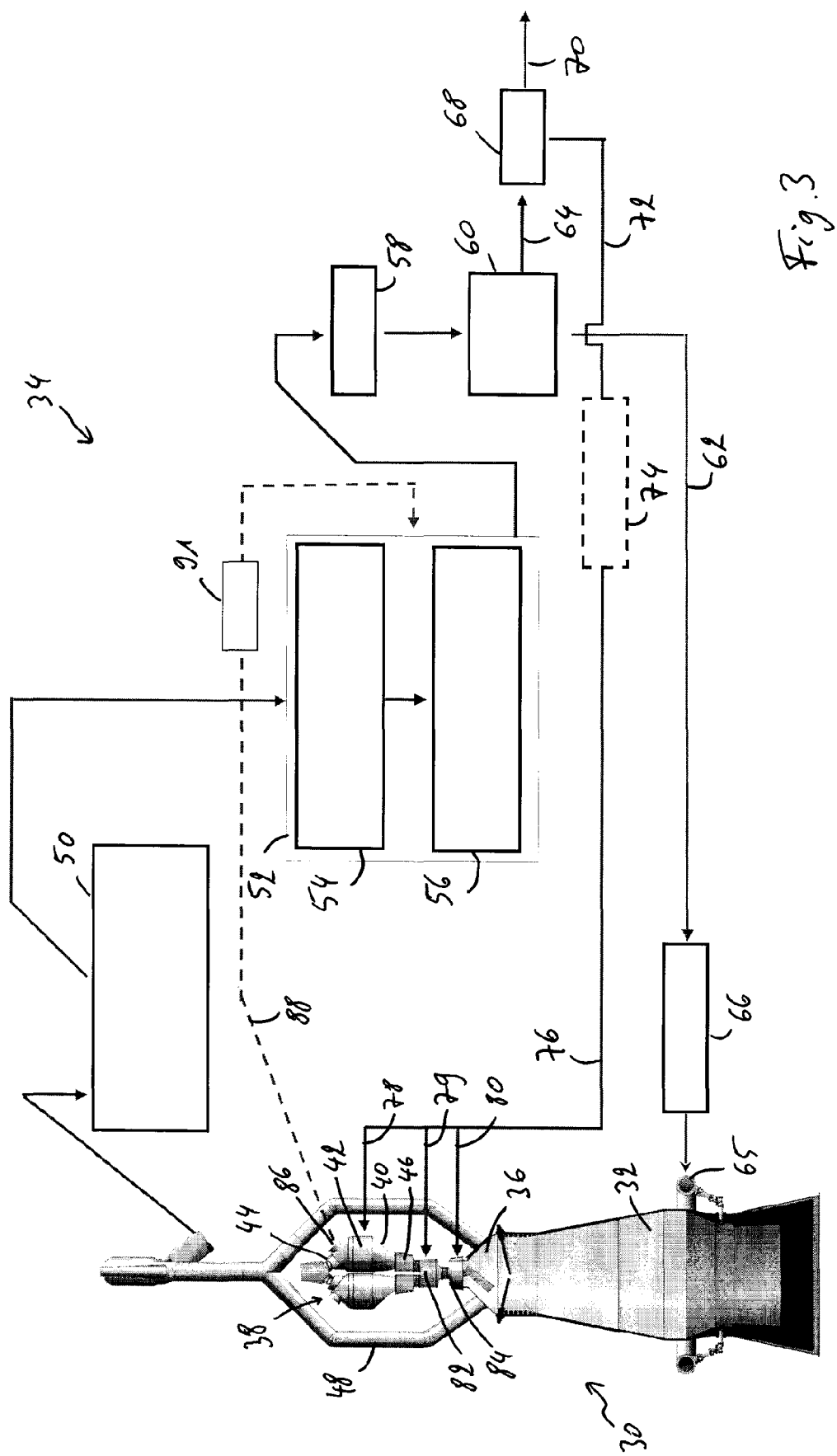
FIG. 3 is a schematic view of a blast furnace installation according to a second embodiment of the present invention.
Figure 4:
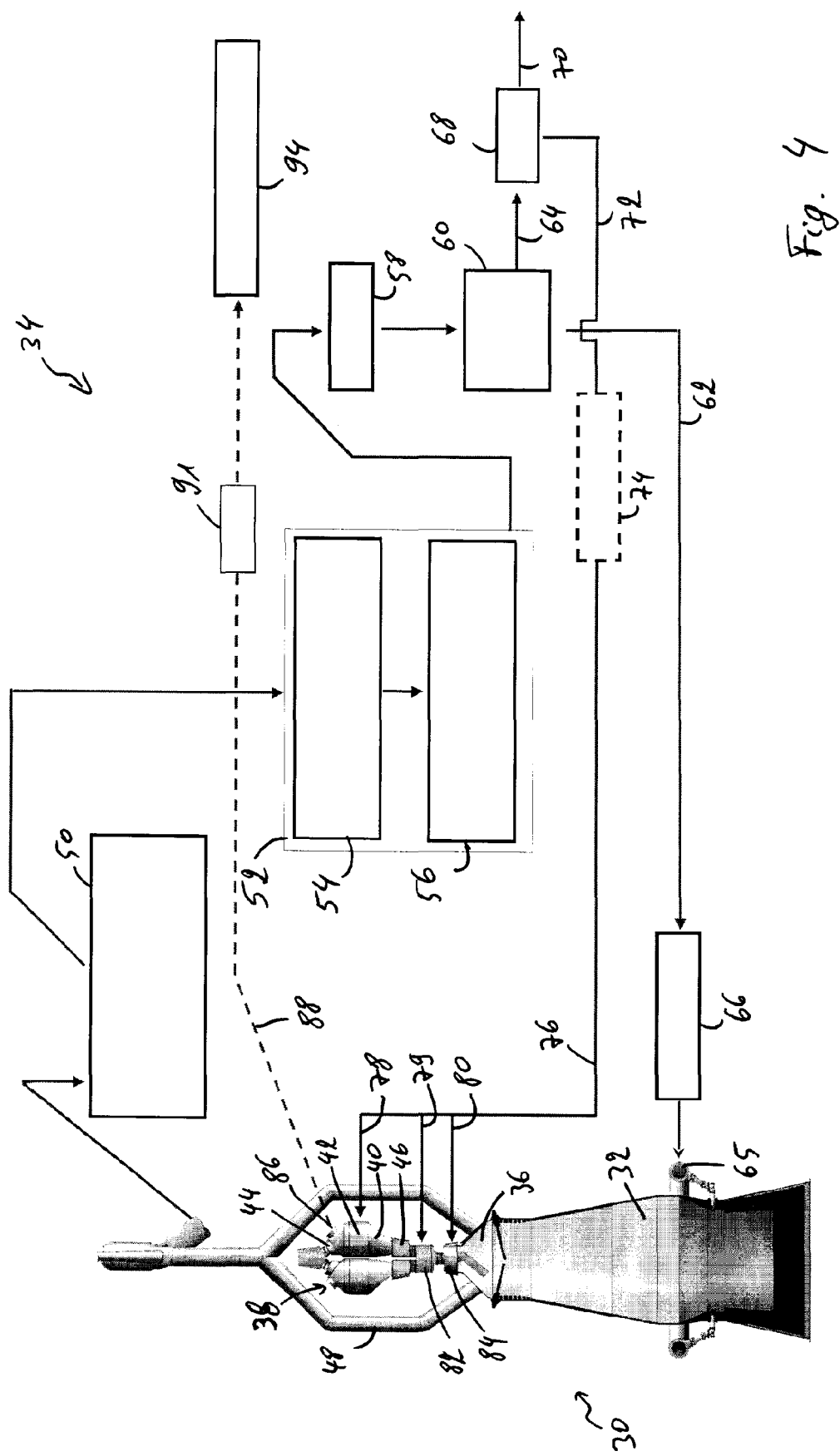
FIG. 4 is a schematic view of a blast furnace installation according to a third embodiment of the present invention.

FIGS. 2 to 4 show a blast furnace installation 30 according to the present invention, comprising a blast furnace 32 and a top gas recycling installation 34. A first embodiment of such a blast furnace installation 30 is shown in FIG. 2. At the top end 36 of the blast furnace 32, a charging device 38 is arranged for feeding a burden to the shaft furnace 32. The charging device 38 comprises, in the embodiment shown, two material hoppers 40, each having a hopper chamber 42 therein for temporarily storing a burden. The material hopper 40 comprises a material inlet aperture and a material discharge aperture for receiving and discharging a burden. An inlet seal valve 44 is associated with the material inlet aperture for sealingly closing the latter. Similarly, a material discharge valve 46 and a discharge seal valve (not shown) are associated with the material discharge aperture for sealingly closing the latter.

In operation, in order to feed a burden to the blast furnace, the material discharge valve 46 and discharge seal valve are closed and the inlet seal valve 44 is opened so as to feed the burden into the hopper chamber 42 of the material hopper 40. Once the desired amount of burden is in the hopper chamber 42, the inlet seal valve 44 is closed. The hopper chamber 42 is then pressurized by feeding pressurizing gas into the hopper chamber 42 as will be described hereunder. When the hopper chamber 42 is sufficiently pressurized, the material discharge valve 46 and the discharge seal valve are opened and the burden is transferred to the blast furnace 32. The operation of the blast furnace itself is well known and will not be further described herein.

The top gas recycling installation 34 comprises means for recovering top gas from the blast furnace 32, for treating the recovered top gas and for injecting the treated top gas back into the blast furnace 32. The top gas recycling installation 34 is more closely described herebelow.

The blast furnace top gas is recovered from the top end 36 of the blast furnace 32 and first fed via a pipe arrangement 48 to a primary gas-cleaning unit 50, wherein the recovered top gas is subjected to a primary cleaning stage for reducing the amount of dust or foreign particles from the recovered to gas. The primary gas-cleaning unit 50 is a dry cleaning stage comprising e.g. an axial cyclone or a dust catcher.

After passing through the primary gas-cleaning unit 50, the now partially cleaned top gas is fed to secondary gas-cleaning unit 52, wherein the recovered top gas is subjected to a secondary cleaning stage, generally a wet cleaning stage. In the secondary gas-cleaning unit 52, the partially cleaned top gas is generally first fed through a pre-washing and cooling stage 54 wherein the top gas is sprayed with water. Subsequently, the partially cleaned top gas is fed through a purification stage 56, wherein the top gas is expanded as it passes through one or more Venturi-type annular passages.

From the secondary gas-cleaning unit 52, the cleaned top gas is fed through a drying unit 58 before being fed to a $CO_2$ removal unit 60, wherein the $CO_2$ content in the top gas is reduced. The $CO_2$ removal unit 60 may be a PSA/VPSA installation, producing a first stream of gas 62 rich in CO and $H_2$ and a second stream of gas 64 containing mainly $CO_2$. The first stream of gas 62 may be used as reduction gas and may be fed back into the blast furnace 32 via a tuyere arrangement 65 after being heated to a temperature of at least 900° C., e.g. by means of hot stoves 66.

According to an important aspect of the present invention, the second stream of gas 64 is divided at a distribution point 68 into a first portion 70 and a second portion 72. While the first portion 70 of the second stream of gas 64 is disposed off, the second portion 72 of the second stream of gas 64 is used as pressurizing gas for the material hopper 42. This pressurizing gas may be fed through a booster unit and buffer tank 74. Such a booster unit and buffer tank 74 may indeed be necessary for compressing the pressurizing gas, in particular if the $CO_2$ removal unit 60 does not comprise a cryogenic unit.

The pressurizing gas, which mainly comprises of carbon dioxide, i.e. generally at least 75% $CO_2$, is fed via a feed line 76 to the charging device 38. The feed line 76 may comprise a first arm 78 for feeding pressurizing gas into the hopper chamber 42 of the material hopper 40. The feed line 76 may however further comprise a second arm 79 and/or a third arm 80 for feeding pressurizing gas to a valve casing 82 and/or a chute transmission gearbox 84 respectively.

The pressurizing gas fed into the hopper chamber 42 via the first arm 78 allows pressurizing the hopper chamber 42 without risking deflagrations, because even in case $O_2$ is trapped in the hopper chamber 42, a mixture of $O_2$ and $CO_2$ cannot lead to such deflagrations. The pressurizing gas fed into the valve casing 82 and the chute transmission gearbox 84 via the second and third arms 79, 80 serves to maintain an overpressure in these components, i.e. the pressure in these components is kept slightly above the blast furnace pressure. The pressurizing gas may also serve as emergency cooling for the valve casing 82 and the chute transmission gearbox 84.

The material hopper 40 may further comprise a gas outlet 86 connected to a gas evacuation line 88 for allowing gas to escape from the hopper chamber 42. According to the embodiment of FIG. 2, the evacuation line 88 feeds the gas recovered from the hopper chamber 42 into the first portion 70 of the second stream of gas 64 for disposal thereof.

The material hopper 40 may further comprise an atmospheric port 90. When the material hopper 40 is to be pressurized, the atmospheric port 90 and/or the gas outlet 86 remain open while the pressurizing gas is fed into the hopper chamber 42 so as to allow any oxygen in the hopper chamber 42 to be evacuated. Once a predetermined amount of pressurizing gas has been fed into the hopper chamber 42, the atmospheric port 90 and the gas outlet 86 are closed and the material hopper 40 is pressurized.

The gas evacuation line 88 further also comprises a filter arrangement 92, through which the gas recovered from the hopper chamber 42 is led before it is fed into the first portion 70 of the second stream of gas 64. The filter arrangement 92 may e.g. comprise a static-electric filter and/or a bag filter for avoiding that dust particles are fed to the first portion 70 of the second stream of gas 64.

Furthermore, an ejector 91 is arranged in the gas evacuation line 88. Such an ejector uses the Venturi effect of a converging-diverging nozzle to convert the pressure energy of a motive fluid to velocity energy, which creates a low-pressure zone that draws in and entrains a suction fluid. Hence, the ejector 91 may be used to draw gas out of the hopper chamber 42 thereby depressurizing the hopper chamber 42 down to atmospheric pressure.

A second embodiment of a blast furnace installation 30 according to the invention is shown in FIG. 3. Most of the features of this embodiment are identical to the ones of the first embodiment and will therefore not be repeated. According to this embodiment, however, the gas evacuation line 88 does not feed the gas recovered from the hopper chamber 42 to the first portion 70 of the second stream of gas 64. Instead, the recovered gas is fed back into the secondary gas-cleaning unit 52, between the pre-washing and cooling stage 54 and the purification stage 56. This allows the recovered gas to be cleaned and fed through the $CO_2$ removal unit 60 again.

A third embodiment of a blast furnace installation 30 according to the invention is shown in FIG. 4. Most of the features of this embodiment are identical to the ones of the first embodiment and will therefore not be repeated. According to this embodiment, however, the gas evacuation line 88 does not feed the gas recovered from the hopper chamber 42 to the first portion 70 of the second stream of gas 64. Instead, the recovered gas is fed to a casthouse dedusting system 94.

The invention claimed is:

1. A method for feeding a burden to a blast furnace, said method comprising:
    providing a charging device having at least one material hopper, said material hopper comprising a hopper chamber, a material inlet aperture for feeding a burden into said hopper chamber, and a material discharge aperture for feeding a burden from said hopper chamber to said blast furnace; said material inlet aperture having an associated inlet seal valve for opening and closing said material inlet aperture and said material discharge aperture having an associated material discharge valve for opening and closing said material discharge aperture;
    opening said material inlet aperture and closing said material discharge aperture;
    feeding a burden into said hopper chamber through said material inlet aperture;
    closing said inlet seal valve;
    pressurizing said hopper chamber by feeding pressurizing gas into said hopper chamber;
    opening said material discharge valve and feeding said burden from said hopper chamber to said blast furnace
    subjecting at least a portion of a top gas recovered from said blast furnace to a recycling process wherein carbon dioxide is removed from said recovered top gas; and
    feeding at least a portion of said recovered carbon dioxide as pressurizing gas into said hopper chamber for pressurizing said hopper chamber.

2. The method according to claim 1, wherein said carbon dioxide is removed from said recovered top gas by Pressure Swing Adsorption or Vacuum Pressure Swing Adsorption.

3. The method according to claim 1, wherein at least a portion of said recovered carbon dioxide is fed to a chute transmission gearbox of said charging device for maintaining an overpressure in said chute transmission gearbox and/or for emergency cooling.

4. The method according to claim 1, wherein at least a portion of said recovered carbon dioxide is fed to a valve casing of said charging device for maintaining an overpressure in said valve casing and/or for emergency cooling.

5. The method according to claim 1, wherein said recovered top gas is subjected to a cleaning process before being subjected to said recycling process; said cleaning process comprising:
   feeding said recovered top gas through a primary cleaning stage for producing a partially cleaned top gas;
   feeding said partially cleaned top gas through a secondary cleaning stage for producing a cleaned top gas; and
   feeding said cleaned top gas through a drying stage for drying said cleaned top gas.

6. The method according to claim 5, wherein said secondary cleaning stage comprises:
   a first step wherein said partially cleaned top gas is pre-washed and cooled; and
   a second step wherein said partially cleaned top gas is further washed and expanded.

7. The method according to claim 1, wherein said recovered carbon dioxide is fed through a booster unit and buffer tank before being fed to said charging device.

8. The method according to claim 1, wherein said material hopper comprises a gas inlet with an associated gas inlet valve and a gas outlet with an associated gas outlet valve, wherein said method comprises:
   closing said inlet seal valve and opening said gas outlet valve before opening said gas inlet valve;
   allowing a predetermined amount of pressurizing gas to flow through said hopper chamber and to escape via said gas outlet before closing said gas outlet valve and pressurizing said hopper chamber.

9. The method according to claim 8, wherein said predetermined amount is up to three times a volume of said hopper chamber.

10. The method according to claim 8, wherein said gas recovered from said hopper chamber via said gas outlet is recycled and fed into said secondary cleaning stage.

11. The method according to claim 8, wherein said gas recovered from said hopper chamber via said gas outlet is fed to a casthouse dedusting system.

12. The method according to claim 8, wherein said gas recovered from said hopper chamber via said gas outlet is fed into a portion of recovered carbon dioxide not used as pressurizing gas.

13. The method according to claim 12, wherein said gas recovered from said hopper chamber via said gas outlet is fed through a filter arrangement before being fed into said portion of recovered carbon dioxide not used as pressurizing gas.

14. The method according to claim 1, wherein said recovered top gas is, after removing said carbon dioxide therefrom, fed back into said furnace as reducing gas.

15. The method according to claim 1, wherein said charging device is of the Bell Less Top type.

\* \* \* \* \*